(12) United States Patent
Che et al.

(10) Patent No.: US 11,659,822 B2
(45) Date of Patent: May 30, 2023

(54) ENERGY-SAVING PADDLEWHEEL AERATOR

(71) Applicant: FISHERY MACHINERY AND INSTRUMENT RESEARCH INSTITUTE, Shanghai (CN)

(72) Inventors: Xuan Che, Shanghai (CN); Changfeng Tian, Shanghai (CN); Xingguo Liu, Shanghai (CN); Xiaolong Chen, Shanghai (CN); Yin Zhou, Shanghai (CN); Lin Zhu, Shanghai (CN)

(73) Assignee: FISHERY MACHINERY AND INSTRUMENT RESEARCH INSTITUTE, Shanghai (CN)

( * ) Notice: Subject to any disclaimer, the term of this patent is extended or adjusted under 35 U.S.C. 154(b) by 5 days.

(21) Appl. No.: 17/567,305

(22) Filed: Jan. 3, 2022

(65) Prior Publication Data

US 2022/0117203 A1   Apr. 21, 2022

Related U.S. Application Data

(63) Continuation of application No. PCT/CN2020/085229, filed on Apr. 17, 2020.

(30) Foreign Application Priority Data

Sep. 23, 2019   (CN) .......................... 201910899776.4

(51) Int. Cl.
*A01K 63/04* (2006.01)
*H02J 7/34* (2006.01)
(Continued)

(52) U.S. Cl.
CPC .............. *A01K 63/042* (2013.01); *H02J 1/12* (2013.01); *H02J 7/345* (2013.01); *H02J 7/35* (2013.01); *H02J 9/061* (2013.01)

(58) Field of Classification Search
CPC combination set(s) only.
See application file for complete search history.

(56) References Cited

FOREIGN PATENT DOCUMENTS

| CN | 202475869 U | 10/2012 |
|---|---|---|
| CN | 202635359 U | 1/2013 |

(Continued)

OTHER PUBLICATIONS

International Search Report (English translated version), PCT/CN2020/085229, dated Jun. 22, 2020, 5 pages.

*Primary Examiner* — Robert L Deberadinis
(74) *Attorney, Agent, or Firm* — Edell, Shapiro & Finnan, LLC

(57) ABSTRACT

An energy-saving paddlewheel aerator is provided. A power supply system of the paddlewheel aerator includes a switching power supply converting main power to direct current, the switching power supply being connected with two terminals of a power mechanism of the paddlewheel aerator and supplying power to the paddlewheel aerator; and a solar power supply module, two ends of the solar power supply module being connected in parallel with a large-capacity capacitor, and two ends of the large-capacity capacitor being connected with the two terminals of the power mechanism of the paddlewheel aerator respectively to supply power to the paddlewheel aerator. A rated output voltage of a solar panel with sufficient power is higher than an output voltage of the switching power supply, and the rated output voltage of the solar panel with insufficient power is lower than the output voltage of the switching power supply.

5 Claims, 4 Drawing Sheets

(51) Int. Cl.
*H02J 1/12* (2006.01)
*H02J 7/35* (2006.01)
*H02J 9/06* (2006.01)

(56) References Cited

FOREIGN PATENT DOCUMENTS

| | | |
|---|---|---|
| CN | 204732884 U | 10/2015 |
| CN | 108770772 A | 11/2018 |
| CN | 110535219 A | 12/2019 |
| JP | 2015149796 A | 8/2015 |

ENERGY-SAVING PADDLEWHEEL AERATOR

CROSS REFERENCE TO RELATED APPLICATION

This patent application is a continuation of International Patent Application No. PCT/CN2020/085229, filed on Apr. 17, 2020, which claims the benefit and priority of Chinese Patent Application No. 201910899776.4 filed on Sep. 23, 2019, the disclosures of which are incorporated by reference herein in their entireties.

TECHNICAL FIELD

The present disclosure relates to an energy-saving paddlewheel aerator, belonging to the technical field of aquaculture aerators.

BACKGROUND

The aerator is one of most important production mechanical equipments for aquaculture, which solves the problem of artificial aeration of a high-density aquaculture pond, so that the aquaculture yield is rapidly improved. The aerator not only can increase the dissolved oxygen in a water body, but also can improve the water quality and improve the vitality and production efficiency of fish, so that the stocking density is increased, the feeding intensity of bred objects is improved, and the growth rate is promoted. The paddlewheel aerator is one type of aerators, and after years of development and improvement, the paddlewheel aerator becomes essential basic equipment for the shrimp farming industry. In general, paddlewheel aerator mainly has two models of 0.75 kW and 1.5 kW, and is configured according to the aquaculture density of 0.37-2 kW/mu. Aeration energy consumption is one of the important costs for shrimp farming.

An existing solar paddlewheel aerator has the problem that the aerator cannot work in rainy days nor at night. If the equipment is equipped with a storage battery, although the equipment can work in rainy days and at night, the cost is high, farmers cannot afford the high cost, and under the condition of long-term rainy days, the storage battery is insufficient in power storage, and the aerator cannot work normally, which affects the breeding production. If the equipment is not equipped with the storage battery, a motor works under the influence of illumination intensity, the rotating speed of the paddlewheel is sometimes high and sometimes low, the aerating effect is poor, and more importantly, the paddlewheel aerator cannot work at night nor in rainy days when the aerating equipment has to be used in aquaculture production.

The existing paddlewheel aerator has the following power supply modes:

Firstly, the storage battery is adopted for supplying power, the cost is high, and battery replacement is difficult; and the mode is rarely used in practice.

Secondly, an external power supply is adopted for supplying power, and the aerator generally works day and night for a long time, so that the problem of high power consumption cost still exists.

Thirdly, a solar panel is adopted for supplying power, due to day-night differentiation, shade-light differentiation and illumination intensity change, the power storage of the solar panel is unstable, the supply voltage is unstable, when the voltage is insufficient, the power of the paddlewheel aerator is reduced, impellers cannot reach the expected rotating speed, and thus the aeration effect is unstable.

How to solve the problems of unstable, high-cost and low-effect aeration is a technical problem urgently needing to be solved in the field of paddlewheel aerators.

SUMMARY

The present disclosure aims to provide an energy-saving paddlewheel aerator which is optimally designed through a power supply system, so that the paddlewheel aerator can work stably under set power, and moreover, the energy consumption and the operation cost can be reduced.

The present disclosure adopts the following technical solutions:

An energy-saving paddlewheel aerator is provided. A power supply system of the paddlewheel aerator comprises: a switching power supply, converting mains power to direct current, the switching power supply being connected with two terminals of a power mechanism of the paddlewheel aerator and supplying power to the paddlewheel aerator; and a solar power supply module, two ends of the solar power supply module being connected in parallel with a large-capacity capacitor, and two ends of the large-capacity capacitor being connected with the two terminals of the power mechanism of the paddlewheel aerator respectively to supply power to the paddlewheel aerator. A rated output voltage of a solar panel with sufficient power is higher than an output voltage of the switching power supply, and the rated output voltage of the solar panel with insufficient power is lower than the output voltage of the switching power supply.

In some embodiments, an anode of the mains power switching power supply is connected with a first rectifier diode and then connected with an anode of the power mechanism; and an anode of the large-capacity capacitor is connected with a second rectifier diode and then connected with the anode of the power mechanism.

In some embodiments, the power mechanism is a direct-current motor 6.

In some embodiments, the solar power supply module and a control system are fixedly installed on a bank of a pond through a support; floating pontoons 9 are fixedly connected together through a frame 8, and bearing seats 2 and a reduction gearbox supporting seat 7 are installed on the frame 8; a reduction gearbox 5 is fixedly installed on the reduction gearbox supporting seat 7, output shafts at two ends of the reduction gearbox are respectively connected with quadrangular couplings 4, impellers 1 are fixed on a transmission shaft 3, and the transmission shaft 3 passes through the bearing seats 2 to be connected with the quadrangular couplings 4.

In some embodiments, a protective cover 10 is installed above the direct-current motor 6.

The present disclosure has the following beneficial effects:

Firstly, a storage battery is replaced with the large-capacity capacitor, and the two ends of the solar panel are connected in parallel with the large-capacity capacitor 1 to provide large current when a load in the circuit is started, and provide buffing energy for the circuit when solar energy is slightly weak and cannot provide enough energy; and the large-capacity capacitor also has the effect of balancing the impact load.

Secondly, the solar power supply module has always been in the state of preferential power supply, and the electricity generated by solar energy is timely utilized regardless of the amount of electricity, so that the solar energy is fully utilized, and the electric energy is greatly saved.

Thirdly, when the solar panel is in a working state all the time and the energy provided by the solar panel is insufficient, the AC circuit compensates the insufficient part, which is mainly realized by two rectifier diodes; if the energy provided by the solar panel can meet the load requirement, the potential of a point B in the circuit is always higher than that of a point A, so that a diode of the solar circuit is always in a conduction state, the solar circuit preferably works, and the load is always powered by the solar panel. If the energy provided by the solar cell panel cannot completely meet the load requirement, the potential of a point C is greater than that of a point F, and a first diode in the mains power circuit is conducted, the mains power is compensated, and when the potential of a point E is lower than that of a point D, the mains power is completely used for supplying power.

Fourthly, the power supply system of the energy-saving paddlewheel aerator does not need to consider the size of starting current, and the insufficient current is supplemented by an alternating-current circuit; and in rainy days and at night, the paddlewheel aerator is powered by the mains power, so that the problem that an existing solar paddlewheel aerator needs to be equipped with a large-size storage battery is solved, the use cost is greatly reduced, and the smooth progress of aquaculture production can be ensured.

DETAILED DESCRIPTION

In the description, the reference numbers are as follows: 1, impeller; 2, bearing seat; 3, transmission shaft; 4, quadrangular coupling; 5, speed reducer; 6, direct-current motor; 7, reduction gearbox supporting seat; 8, frame; and 9, floating pontoon.

In FIG. 4, FIG. 5, FIG. 6 and FIG. 7, AC denotes alternating current (mains power), DC denotes direct current (solar power generation), and the percentage sign denotes proportion of power supply.

The present disclosure is further described in conjunction with the attached figures and embodiments.

Figure 2:
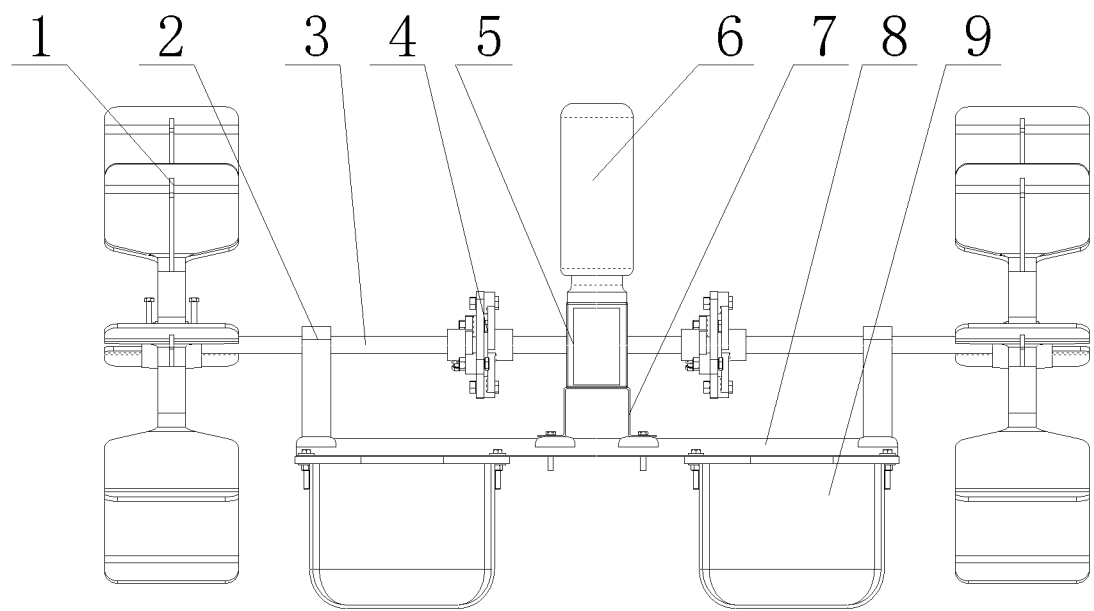
FIG. 2 is a front view of the energy-saving paddlewheel aerator in the present disclosure.
Figure 3:
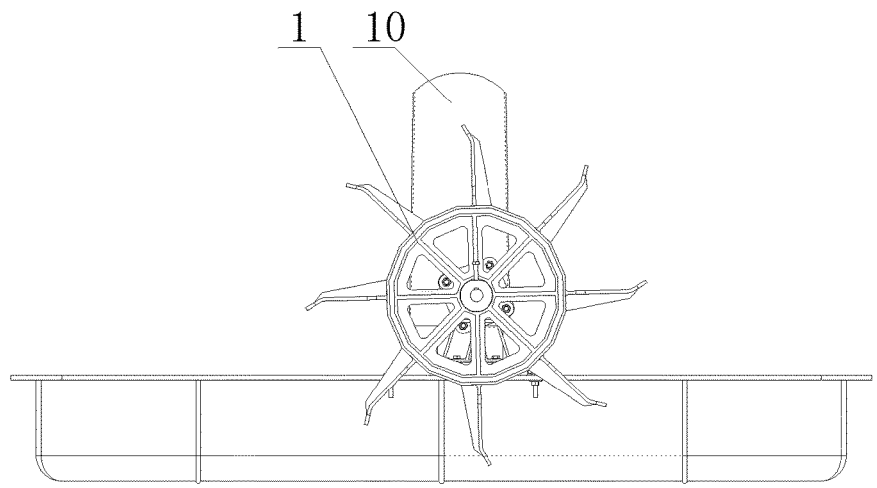
FIG. 3 is a left view of the energy-saving paddlewheel aerator in the present disclosure.
Figure 4:
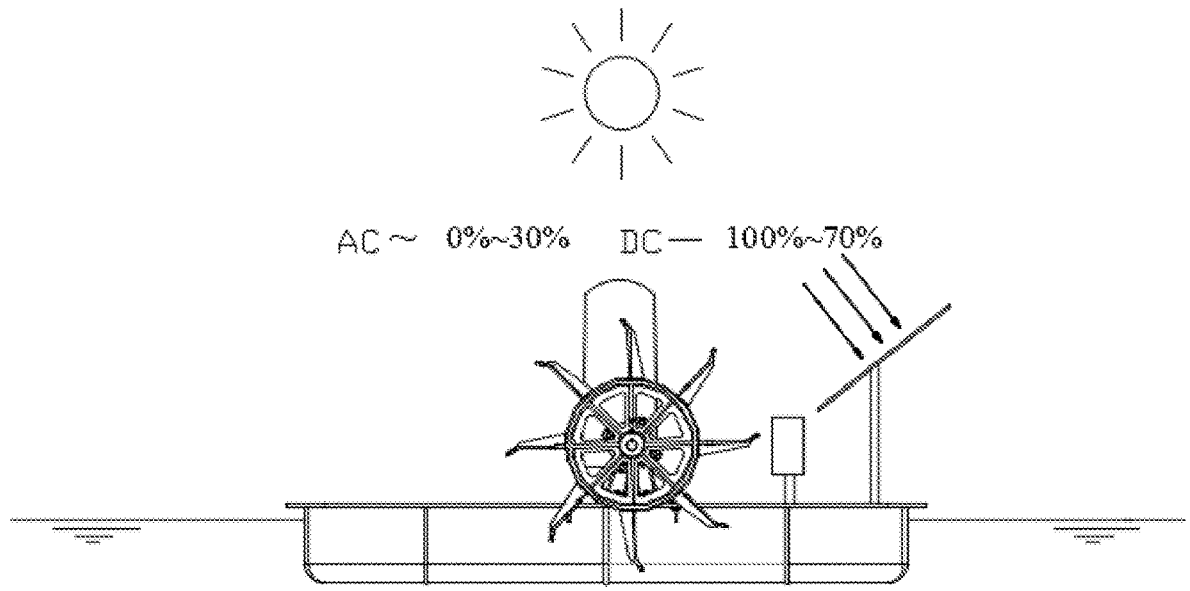
FIG. 4 is a schematic diagram of a working state of the energy-saving paddlewheel aerator in the present disclosure during the daytime in sunny days.
Figure 5:
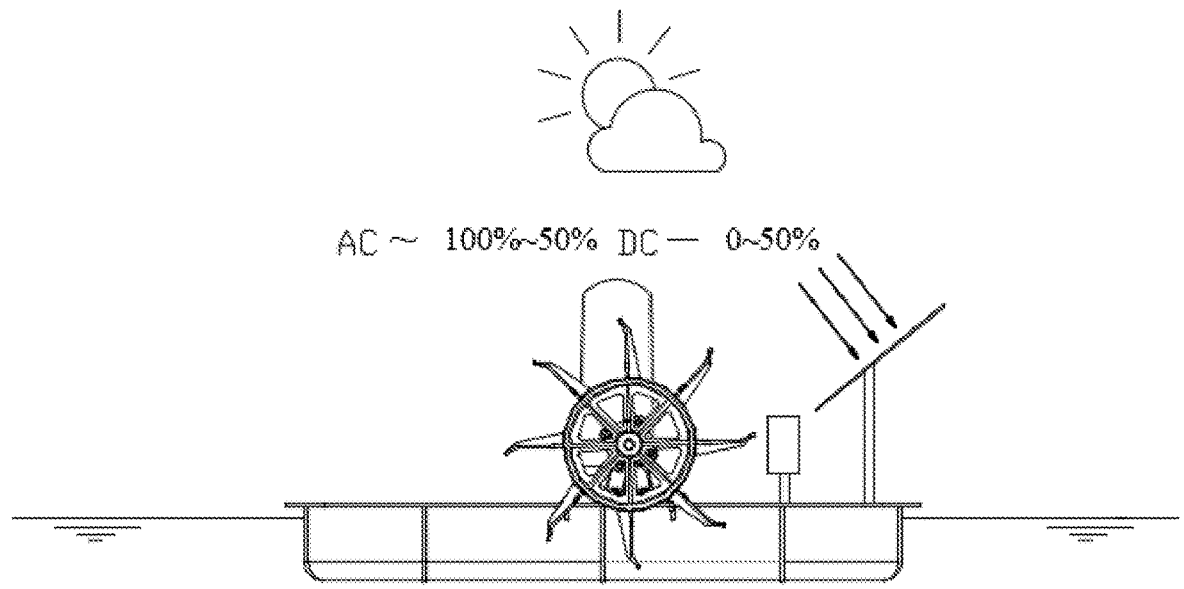
FIG. 5 is a schematic diagram of a working state of the energy-saving paddlewheel aerator in the present disclosure during the daytime in cloudy days.
Figure 6:
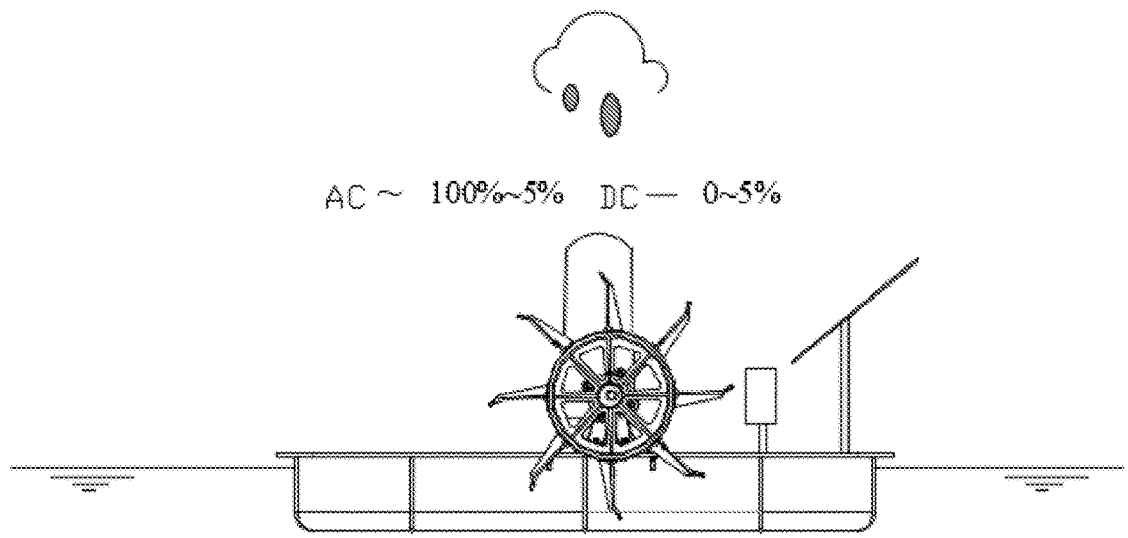
FIG. 6 is a schematic diagram of a working state of the energy-saving paddlewheel aerator in the present disclosure during the daytime in rainy days.
Figure 7:
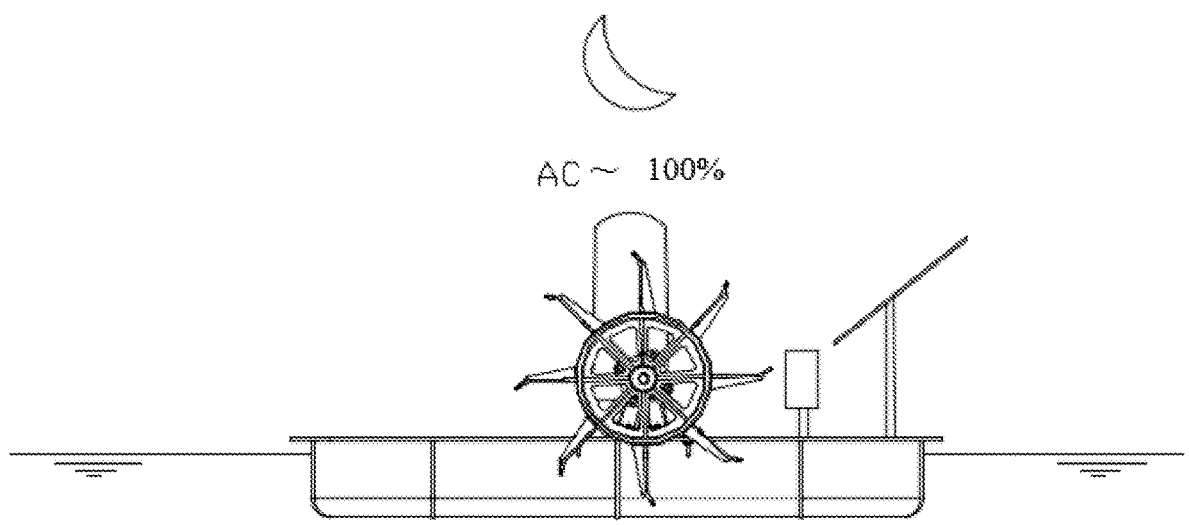
FIG. 7 is a schematic diagram of a working state of the energy-saving paddlewheel aerator in the present disclosure at night.

Firstly, FIG. 2 shows an appearance structure of an energy-saving paddlewheel aerator in the present disclosure.

Figure 1:
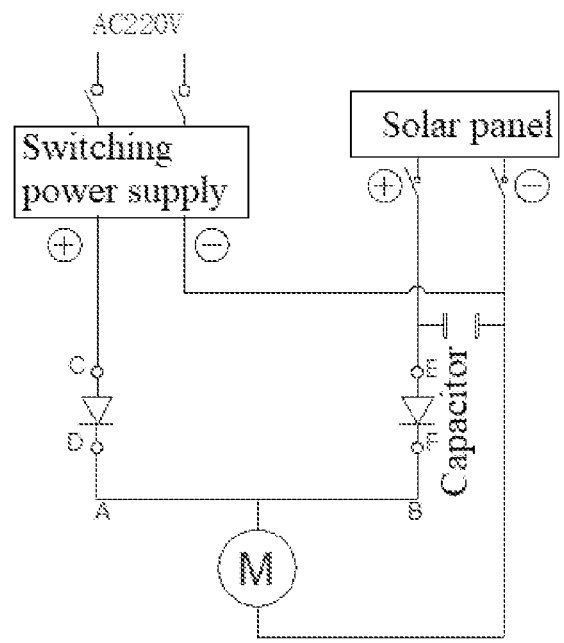
FIG. 1 is a circuit diagram of a power supply system of an energy-saving paddlewheel aerator in the present disclosure.

Referring to FIG. 1, a power supply system of the paddlewheel aerator comprises: a switching power supply converting mains power to direct current, the switching power supply being connected with two terminals of a power mechanism of the paddlewheel aerator and supplying power to the paddlewheel aerator; and a solar power supply module, two ends of the solar power supply module being connected in parallel with a large-capacity capacitor, and two ends of the large-capacity capacitor being connected with the two terminals of the power mechanism of the paddlewheel aerator, so as to supply power to the paddlewheel aerator. A rated output voltage of a solar panel with sufficient power is higher than an output voltage of the switching power supply, and the rated output voltage of the solar panel with insufficient power is lower than the output voltage of the switching power supply. In the technical solution, a storage battery is replaced with the large-capacity capacitor, and the two ends of the solar panel are connected in parallel with the large-capacity capacitor to provide large current when a load in the circuit is started, and provide buffing energy for the circuit when solar energy is slightly weak and cannot provide enough energy. The solar power supply module has always been in a preferential power supply state, and the electricity generated by solar energy is timely utilized regardless of the amount of the electricity, so that the solar energy is fully utilized, and the electric energy is greatly saved. The large-capacity capacitor also has the effect of balancing the impact load.

Continuously referring to FIG. 1, an anode of the mains power switching power supply is connected with a first rectifier diode and then connected with an anode of the power mechanism; and an anode of the large-capacity capacitor is connected with a second rectifier diode and then connected with the anode of the power mechanism.

Referring to FIG. 2, the power mechanism is a direct-current motor 6.

In the embodiment, the rated output voltage of the solar panel with sufficient power is slightly higher than the output voltage of the switching power supply, so that the solar panel preferably works during normal work. Continuously referring to FIG. 2, when the solar panel is in a working state all the time and the energy provided by the solar panel is insufficient, the AC circuit compensates the insufficient part, which is mainly realized by two rectifier diodes. If the energy provided by the solar panel can meet the load requirement, the potential of a point B in the circuit is always higher than that of a point A, so that a diode of the solar circuit is always in a conduction state, the solar circuit preferably works, and the load is always powered by the solar panel. If the energy provided by the solar cell panel cannot completely meet the load requirement, the potential of a point C is greater than that of a point F, and a first diode in the mains power circuit is conducted, the mains power is compensated, and when the potential of a point E is lower than that of a point D, the mains power is completely used for supplying power.

The power supply system of the energy-saving paddlewheel aerator does not need to consider the size of starting current, and the insufficient current is supplemented by an alternating-current circuit. In rainy days and at night, the paddlewheel aerator is powered by the mains power, so that the problem that an existing solar paddlewheel aerator needs to be equipped with a storage battery is solved, the use cost is greatly reduced, and the smooth progress of aquaculture production can be ensured.

The appearance structure of the energy-saving paddlewheel aerator in the present disclosure is further described as follows: the solar power supply module and a control system are fixedly installed on the bank of a pond through a support; floating pontoons 9 are fixedly connected together through a frame 8, and bearing seats 2 and a reduction gearbox supporting seat 7 are installed on the frame 8; a reduction gearbox 5 is fixedly installed on the reduction gearbox supporting seat 7, output shafts at the two ends of the reduction gearbox are connected with quadrangular couplings 4, impellers 1 are fixed on transmission shafts 3, and the transmission shafts 3 pass through the bearing seats 2 to be connected with the quadrangular couplings 4. The protective cover 10 is installed above the direct-current motor 6.

The basic working principle of the paddlewheel aerator is that a direct-current motor 6 of the paddlewheel aerator drives the impellers 1 to rotate so as to stir a water body to aerate oxygen.

What is claimed is:

1. An energy-saving paddlewheel aerator, wherein
a power supply system of the paddlewheel aerator comprises:
   a switching power supply, converting main power to direct current, the switching power supply being connected with two terminals of a power mechanism of the paddlewheel aerator and supplying power to the paddlewheel aerator, and
   a solar power supply module, two ends of the solar power supply module being connected in parallel with a large-capacity capacitor, and two ends of the large-capacity capacitor being connected with the two terminals of the power mechanism of the paddlewheel aerator respectively to supply power to the paddlewheel aerator; and
   a rated output voltage of a solar panel with sufficient power is higher than an output voltage of the switching power supply, and the rated output voltage of the solar panel with insufficient power is lower than the output voltage of the switching power supply.

2. The energy-saving paddlewheel aerator according to claim 1, wherein an anode of the switching power supply of the main power is connected with a first rectifier diode and then connected with an anode of the power mechanism; and an anode of the large-capacity capacitor is connected with a second rectifier diode and then connected with the anode of the power mechanism.

3. The energy-saving paddlewheel aerator according to claim 1, wherein the power mechanism is a direct-current motor.

4. The energy-saving paddlewheel aerator according to claim 2, wherein the solar power supply module and a control system are fixedly installed on a bank of a pond through a support; floating pontoons are fixedly connected together through a frame, and bearing seats and a reduction gearbox supporting seat are installed on the frame; a reduction gearbox is fixedly installed on the reduction gearbox supporting seat, output shafts at two ends of the reduction gearbox are respectively connected with quadrangular couplings, impellers are fixed on a transmission shaft, and the transmission shaft passes through the bearing seats to be connected with the quadrangular couplings.

5. The energy-saving paddlewheel aerator according to claim 4, wherein a protective cover is installed above the direct-current motor.

* * * * *